US011543120B2

(12) United States Patent
Lykke et al.

(10) Patent No.: US 11,543,120 B2
(45) Date of Patent: Jan. 3, 2023

(54) METHOD FOR INTER-BED COOLING IN WET GAS SULFURIC ACID PLANTS

(71) Applicant: HALDOR TOPSØE A/S, Kgs. Lyngby (DK)

(72) Inventors: Mads Lykke, Brønshøj (DK); Martin Møllerhøj, Birkerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 499 days.

(21) Appl. No.: 16/620,128

(22) PCT Filed: Jun. 26, 2018

(86) PCT No.: PCT/EP2018/067104
§ 371 (c)(1),
(2) Date: Dec. 6, 2019

(87) PCT Pub. No.: WO2019/007753
PCT Pub. Date: Jan. 10, 2019

(65) Prior Publication Data
US 2020/0149735 A1    May 14, 2020

(30) Foreign Application Priority Data

Jul. 6, 2017    (DK) .......................... PA 2017 00402

(51) Int. Cl.
| | | |
|---|---|---|
| F22B 1/18 | (2006.01) | |
| C01B 17/80 | (2006.01) | |
| C01B 17/775 | (2006.01) | |
| C01B 17/765 | (2006.01) | |
| B01J 8/04 | (2006.01) | |
| B01D 53/86 | (2006.01) | |

(52) U.S. Cl.
CPC ............ *F22B 1/18* (2013.01); *B01D 53/8612* (2013.01); *B01J 8/0492* (2013.01); *B01J 8/0496* (2013.01); *C01B 17/765* (2013.01); *C01B 17/775* (2013.01); *C01B 17/803* (2013.01); *C01B 17/806* (2013.01); *B01D 2257/304* (2013.01); *B01D 2257/306* (2013.01); *B01J 2208/00194* (2013.01)

(58) Field of Classification Search
CPC ..... Y02P 20/10; C01B 17/765; C01B 17/803; C01B 17/806; C01B 17/775; B01D 53/8612; B01D 53/8603; B01D 2257/306; B01D 2257/304; B01D 2257/308; B01J 2208/00194; B01J 8/0492; B01J 2208/00168; B01J 8/0496; B01J 8/0453; F22B 1/18
See application file for complete search history.

(56) References Cited

U.S. PATENT DOCUMENTS

| | | | |
|---|---|---|---|
| 2,193,816 A | | 3/1940 | Houdry |
| 3,147,074 A | | 9/1964 | Maurer |
| 3,350,169 A | | 10/1967 | Rinckhoff |
| 3,432,264 A | | 3/1969 | Bostwick et al. |
| 3,536,446 A | | 10/1970 | Maurer |
| 3,653,828 A | | 4/1972 | Connor et al. |
| 4,478,809 A | * | 10/1984 | McAlister ............ C01B 17/806 165/103 |
| 7,361,326 B2 | | 4/2008 | Christensen |
| 7,883,507 B2 | | 2/2011 | Jarrard et al. |
| 2013/0000869 A1 | | 1/2013 | Daum et al. |
| 2015/0147266 A1 | | 5/2015 | Møllerhøj |
| 2015/0352510 A1 | | 12/2015 | Rizzi et al. |

FOREIGN PATENT DOCUMENTS

| | | | | |
|---|---|---|---|---|
| CN | 103318847 A | | 9/2013 | |
| CN | 104379503 A | | 2/2015 | |
| CN | 107 381 513 A | * | 11/2017 | ........... C01B 17/803 |
| DE | 19522927 A1 | | 1/1997 | |
| EP | 2163515 A2 | | 3/2010 | |
| EP | 2561921 A1 | | 2/2013 | |
| EP | 2610001 A1 | | 7/2013 | |
| NZ | 203892 A | | 2/1986 | |
| RU | 2327632 C1 | | 6/2008 | |
| WO | 2008064698 A1 | | 6/2008 | |
| WO | 2013182502 A1 | | 12/2013 | |

(Continued)

OTHER PUBLICATIONS

Office Action dated Oct. 19, 2021, by the Federal Service for Intellectual Property in Russian Patent Application No. 2020105255/05(007997) and an English Translation of the Office Action. (16 pages).
Office Action (Text of the First Office Action) dated Jun. 29, 2021, by the China National Intellectual Property Administration in corresponding Chinese Patent Application No. 201810723900.7, and an English Translation of the Office Action. (11 pages).
Danish Search Report dated Dec. 20, 2017.
International Search Report (PCT/ISA/210) dated Sep. 10, 2018, by the European Patent Office as the International Searching Authority for International Application No. PCT/EP2018/067104.
Written Opinion (PCT/ISA/237) dated Sep. 10, 2018, by the European Patent Office as the International Searching Authority for International Application No. PCT/EP2018/067104.

(Continued)

*Primary Examiner* — Timothy C Vanoy

(74) *Attorney, Agent, or Firm* — Buchanan Ingersoll & Rooney P.C.

(57) ABSTRACT

In a method for cooling of process gas between catalytic layers or beds in a sulfuric acid plant, in which sulfuric acid is produced from feed gases containing sulfurous components like $SO_2$, $H_2S$, $CS_2$ and COS or liquid feeds like molten sulfur or spent sulfuric acid, one or more boilers, especially water tube boilers, are used instead of conventional steam superheaters to cool the process gas between the catalytic beds in the $SO_2$ converter of the plant. Thereby a less complicated and more cost efficient heat exchanger layout is obtained.

11 Claims, 4 Drawing Sheets

(56) References Cited

FOREIGN PATENT DOCUMENTS

WO     WO 2019 068 625 A1 *   4/2019    ........... B01J 8/0496

OTHER PUBLICATIONS

Figure 1:
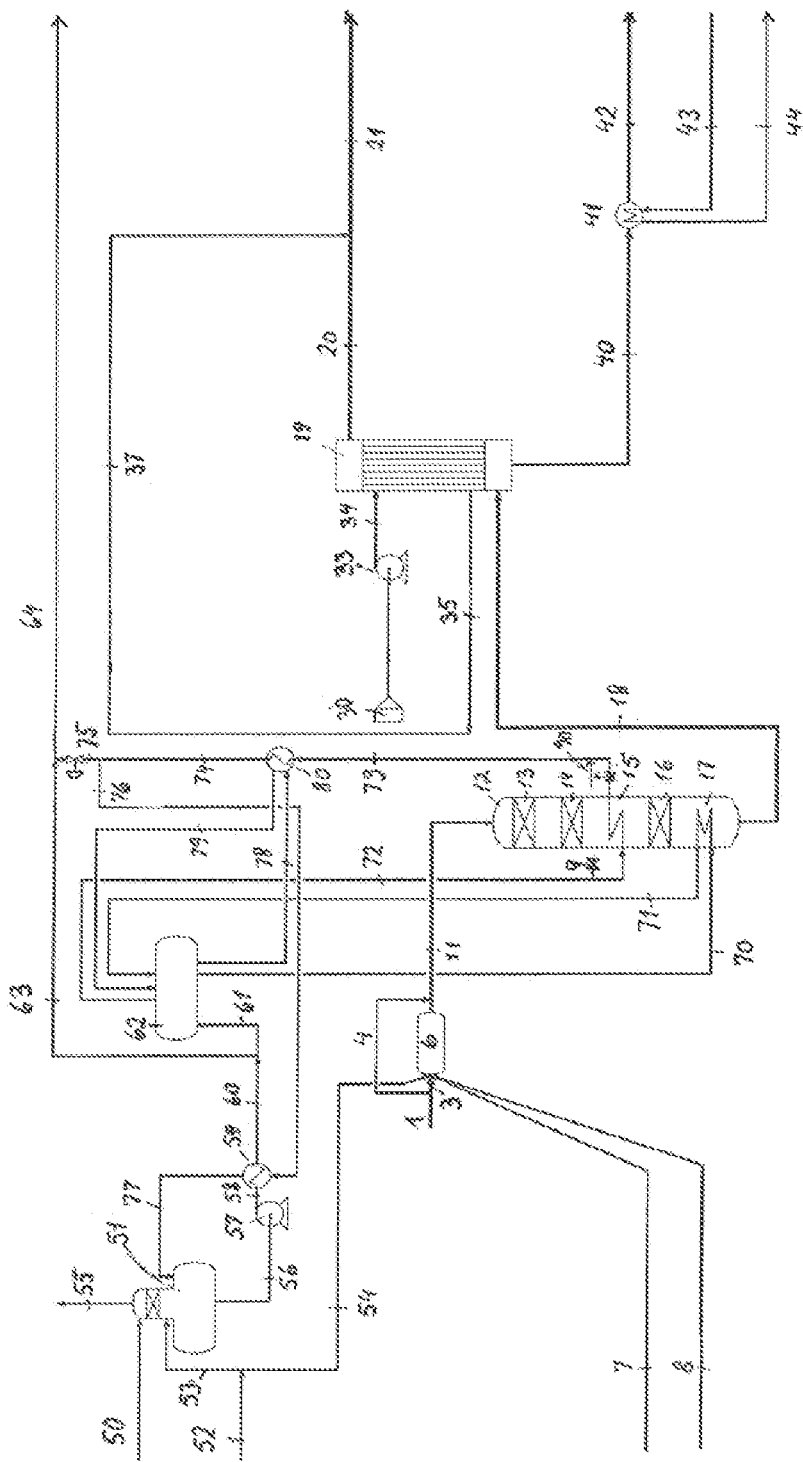

Office Action dated Jul. 9, 2021, by the Intellectual Property India, Government of India in corresponding Indian Patent Application No. 201917052347, and an English Translation of the Office Action (6 pages).

Office Action and Search Report dated Jul. 5, 2021, by the Chilean Patent Office in Chilean Patent Application No. 202000011 and an English Translation of the Office Action and Search Report. (31 pages).

* cited by examiner

METHOD FOR INTER-BED COOLING IN WET GAS SULFURIC ACID PLANTS

The present invention relates to a method for inter-bed cooling of process gas between catalytic layers or beds in a wet gas sulfuric acid (WSA) plant, in which sulfuric acid is produced from acid feed gases containing sulfurous components like $SO_2$, $H_2S$, $CS_2$ and COS or liquid feeds like molten sulfur or spent sulfuric acid originating from alkylation technologies or so-called BTX production.

Sulfuric acid ($H_2SO_4$) is an important commodity chemical, the production of which exceeds 200 million t/year. It is primarily used for fertilizer production, but it is also used i.a. in the manufacture of viscose fibers, pigments, in batteries, in the metallurgical industry and in refining industry.

In the sulfuric acid plant, the sulfurous feed components are typically converted into $SO_2$ in a thermal combustor. The $SO_2$ gas is then further oxidized to $SO_3$ according to the below reaction using a catalyst active for oxidation of $SO_2$:

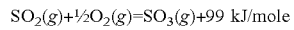
$$SO_2(g) + \tfrac{1}{2}O_2(g) = SO_3(g) + 99 \text{ kJ/mole}$$

Because that reaction is an equilibrium reaction, and the oxidation of $SO_2$ releases energy, higher temperatures will limit the conversion of $SO_2$ to $SO_3$. For this reason, an industrial $SO_2$ converter is normally configured as a number of adiabatic catalytic beds with inter-bed cooling to increase the total conversion.

Downstream the $SO_2$ conversion step(s), the $SO_3$ formed is reacted with $H_2O$ to form $H_2SO_4$, and then the $H_2SO_4$ is separated from the gas phase in a condensation step, producing concentrated commercial grade $H_2SO_4$ and a cleaned process gas, either to be sent directly to a stack or to be sent to further cleaning before being emitted to the atmosphere.

Besides the obvious sulfuric acid production and securing as low emission amounts to the atmosphere as possible, the sulfuric acid plants are increasingly met with a demand to increase the thermal efficiency of the operation. A high degree of energy recovery either reduces the need for any (expensive) support fuel/heat or increases the export of high value energy, e.g. as high pressure steam.

With strong demands for both high sulfuric acid production (low emissions) and high heat recovery, the complexity of the entire plant can increase quite significantly, and this is especially true for sulfuric acid plants in which the energy evolved in the chemical conversion in combustors and/or converters is low. The complexity of the plant may decrease the flexibility and operability of the plant.

The normal configuration of the heat exchanger system for a WSA plant includes steam superheaters for the inter-bed cooling. The saturated steam is produced in the waste heat boiler and the process gas cooler. However, in some configurations, especially in viscose plants and spent acid regeneration (SAR) plants, the steam produced in the waste heat boiler is insufficient for the inter-bed cooler(s), and therefore a steam cooler (de-superheating of steam by boiling water or pre-heating boiler feed water) is necessary. The result is a complicated and expensive heat exchanger layout.

In a WSA plant, there is water and $SO_3$ vapor present in the converted process gas, and thus liquid sulfuric acid will condense if the temperature is below the sulfuric acid dew point. On the other hand, the process gas temperature at the inlet of the sulfuric acid condensation step is typically limited to maximum 290° C. due to the use of fluorinated polymers in the inlet of the WSA condenser. A WSA plant can typically be designed for a sulfuric acid dew point up to 260-263° C. at the inlet of the WSA condenser. Therefore, in order to provide sufficient temperature approach in the process gas cooler, which is the last cooling step before the WSA condenser, and at the same time to have sufficient safety margin to the sulfuric acid dew point, the saturated steam temperature in the steam system is typically selected to be 12-15° C. higher than the sulfuric acid dew point, i.e. 275° C. which gives 15° C. temperature approach in the cold end of the process gas cooler. A saturated steam temperature of 275° C. is equivalent to a steam pressure of 58.5 barg.

Regarding prior art, US 2015/0352510 A1 discloses an adiabatic multi-bed catalytic converter with inter-bed cooling. This converter comprises a pressure vessel, a plurality of super-imposed catalytic beds, each being configured with a cylindrical annular container and an axial core passage, and means for inter-bed cooling of a gas stream between at least two of said catalytic beds. The means for inter-bed cooling includes a heat exchanger comprising heat exchange bodies, which extend axially through the core passages of at least two consecutive catalytic beds, and a wall system, which is also arranged in said core passages and surrounds said heat exchange bodies, to define a boundary of a shell side of the heat exchanger. The wall system is structured in such a way that the shell side of the heat exchanger comprises at least a first space and a second space, and therefore the means for inter-bed cooling has nothing in common with a water tube boiler.

EP 2 610 001 A1 also describes an adiabatic multi-bed catalytic converter with inter-bed cooling as well as a related process. This converter comprises a shell, which includes at least an inlet for a stream of fresh reagents and an outlet for a product stream, a number of catalytic beds arranged in series, and a number of inter-bed heat exchangers fed with a cooling medium and arranged to cool a process stream flowing from one bed to another. The process related to the converter comprises a plurality of adiabatic reaction steps through respective catalytic beds arranged in series, so that a process stream exiting the first bed or an intermediate catalytic bed is fed to the next catalytic bed, and the process stream exiting the last catalytic bed forms the product stream. The inter-bed cooling steps provide that a process stream is cooled by indirect heat exchange with a cooling medium. The process is characterized in that at least one process stream, leaving a generic first catalytic bed for passage into a second and downstream catalytic bed, is mixed with a quench flow of reagents, allowing for a precise control of the temperature of the process stream, before entering the second bed, said quench flow having a temperature lower than the temperature of the process stream. There is no indication that the inter-bed cooling may be obtained using a water tube boiler.

US 2015/0147266 A1, belonging to the Applicant, relates to a process plant for the oxidation of $SO_2$ to $SO_3$, in which an oxidized process gas is cooled in an inter-bed cooler and subsequently subjected to further cooling by heat exchange in a boiler, which preferably is a water tube boiler. Said boiler is, however, not used for inter-bed cooling within the converter, but rather for subsequent cooling after the converter, and the type of inter-bed cooler used is not specified.

Finally, U.S. Pat. Nos. 3,350,169 A, 3,653,828 A, 3,432,264 A, 3,147,074 A, NZ 203892 A, U.S. Pat. No. 3,536,446 A and EP 2 561 921 A1, the latter belonging to the Applicant, all describe processes for catalytically converting process gases comprising $SO_2$ into $SO_3$ as part of a process for producing sulfuric acid. The conversion of $SO_2$ into $SO_3$ is carried out by passing the process gas over a series of catalyst beds. The process gas is cooled between the beds by passing it through boilers which heat water to produce steam. The $SO_2$ is produced by combustion of various sources of sulfur, such as spent sulfuric acid, hydrogen sulfide, molten sulfur or other sulfides. With the exception of EP 2 561 921 A1, all these documents describe plants fed with a dry gas, so that the streams can be mixed as desired without having to care about the sulfuric acid dew points and also without having to care about the selection of pressure and feed water temperature in the boilers. As regards EP 2 561 921 A1, a boiler feed water pre-heater is installed, said pre-heater being designed as an ordinary heat exchanger just like the existing steam superheaters apart from the fact that only water is being heated.

The present invention provides a process layout, where high sulfuric acid production, high heat recovery and low complexity are combined, providing optimal operation of the plant without the loss of operability and flexibility. At the same time, the investment cost of this new layout is lower than that of the currently used plant layout. More specifically, the idea of the invention is to use water tube boilers for inter-bed cooling as an alternative to superheaters. This will result in a significant simplification of the overall process layout and substantial cost reductions due to a lower total heat exchange area.

The reason for the reduced heat exchanger area is the higher temperature approach in a boiler compared to a superheater and a higher heat transfer coefficient of boiling water compared to steam.

Thus, the present invention relates to a method for the cooling of process gas between catalytic layers or beds in a wet gas sulfuric acid plant, in which sulfuric acid is produced from feed gases containing sulfurous components like $SO_2$, $H_2S$, $CS_2$ and COS or liquid feeds like molten sulfur or spent sulfuric acid, wherein one or more boilers are used instead of conventional steam superheaters to cool the process gas between the catalytic beds in the $SO_2$ converter of the plant.

The inter-bed boilers used according to the invention are preferably water tube boilers, especially horizontal or approximately horizontal water tube boilers. Fire tube boilers and vertical water tube boilers can also be used, but the horizontal water tube boiler is the most cost efficient embodiment.

The tubes in the water tube boilers can be bare, fitted with fins or have a combination of finned and bare tubes in the tube bank.

The process gas preferably originates from combustion of at least one feed stream of spent sulfuric acid.

Preferably at least one of the feed streams to the plant is a $CS_2$ and $H_2S$ containing gas from a viscose fiber production plant.

In order to be able to control the inlet temperature to the downstream catalyst bed, a shell side bypass is required. Furthermore, there are certain restrictions in the stratification inlet to the downstream catalyst bed to maintain the conversion rate. This means that an arrangement for mixing the bypassed gas into the cooled gas is required.

So the invention deals with the way the inter-bed cooling is carried out. The inter-bed cooling will typically be carried out in a heat exchanger using molten heat transfer salt, process gas (converted or unconverted), air or steam (saturated or superheated) or by quenching with colder air or process gas. For most plants, the inter-bed cooling of the process gas is carried out with high pressure steam, cooling the process gas by superheating the steam. The process gas temperature is then controlled by adjusting the flow of steam to the inter-bed cooler, i.e. usually there is a steam bypass around the inter-bed cooler.

The inter-bed cooler can be placed within the $SO_2$ converter shell as well as on the outside of the converter shell. For WSA plants, it is general practice to use inter-bed coolers located inside the $SO_2$ converter shell, such that the cold areas of the heat exchanger are avoided, thus reducing the risk of sulfuric acid condensation and corrosion.

Figure 2:
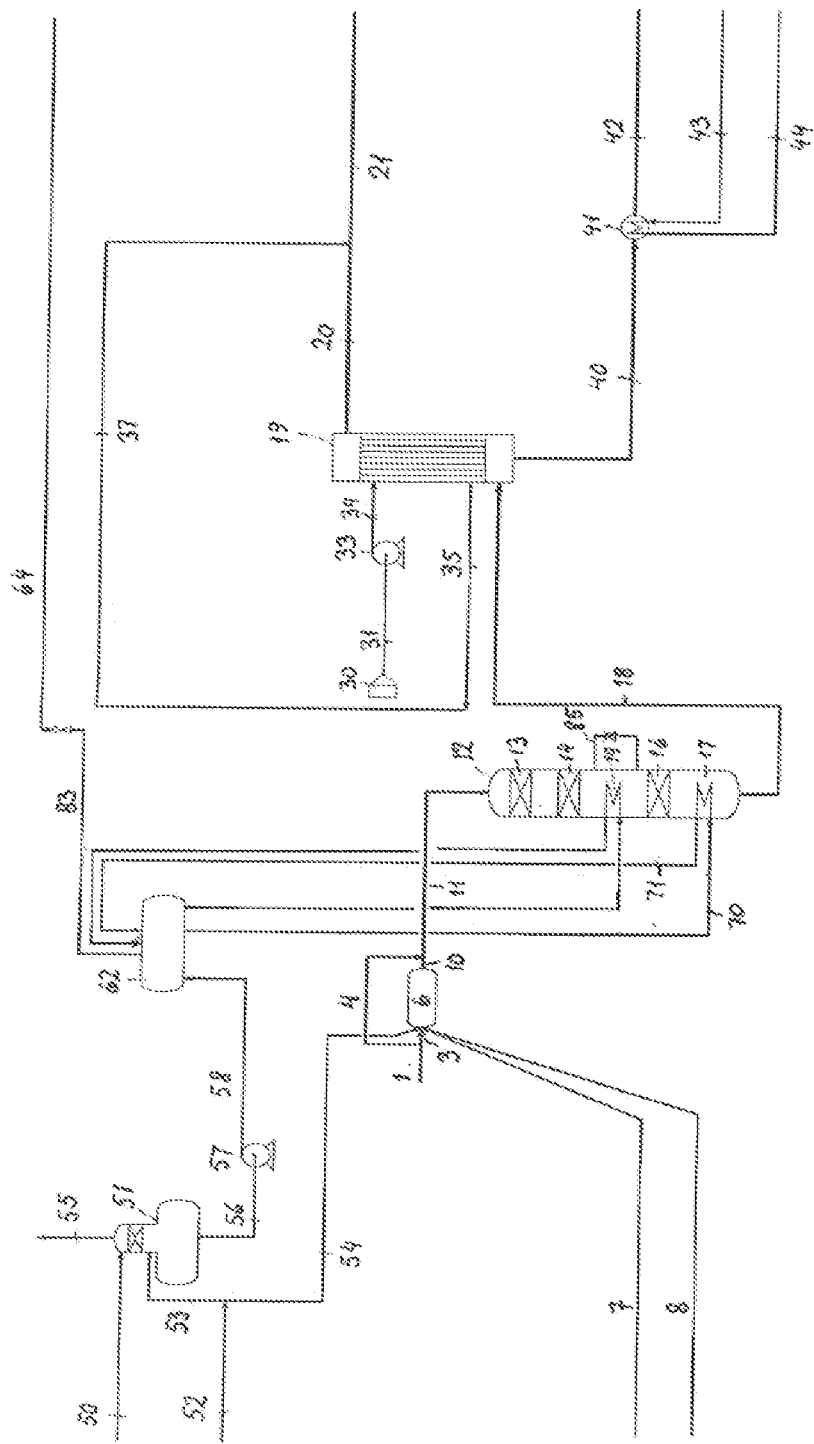
Figure 3:
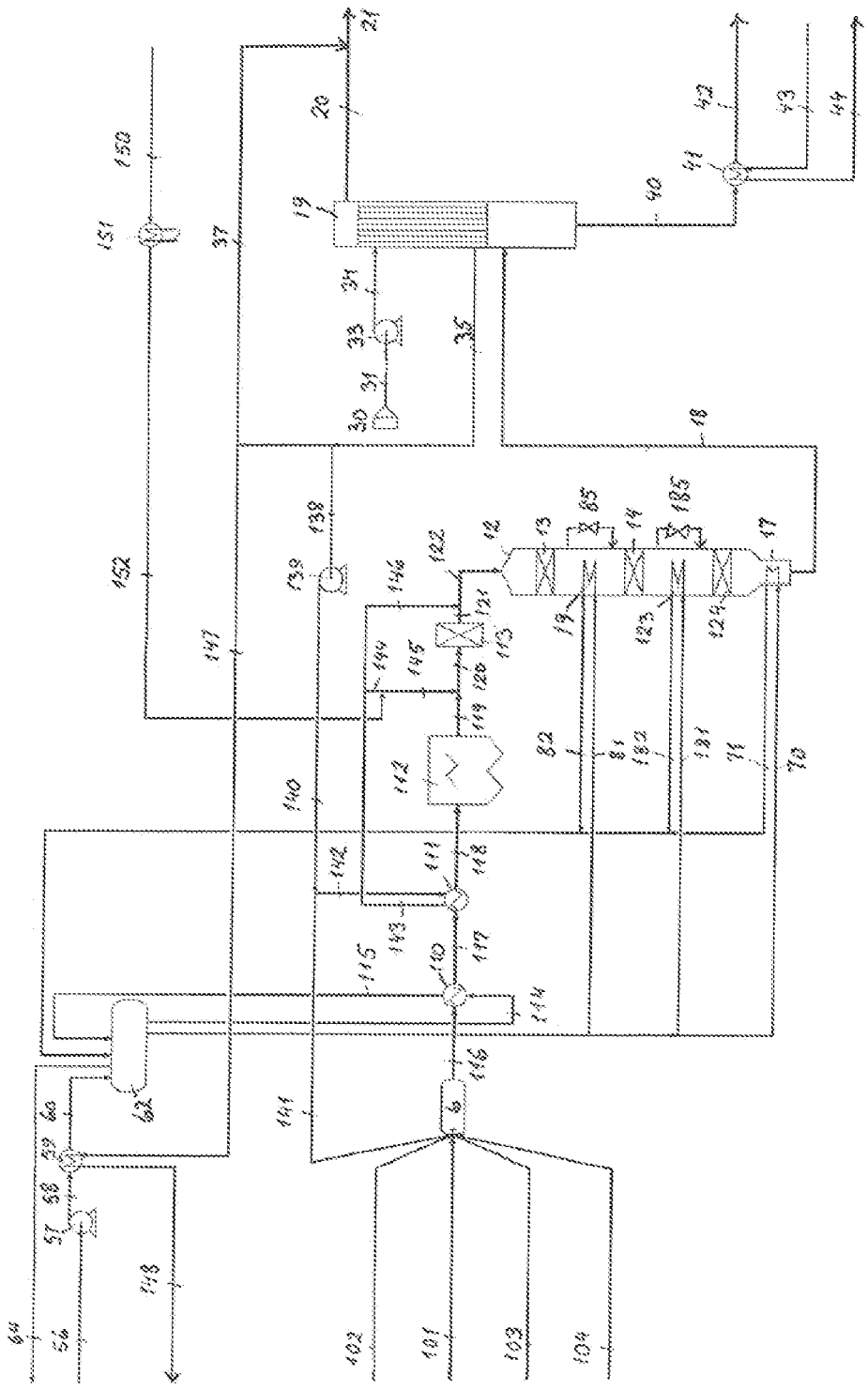
Figure 4:
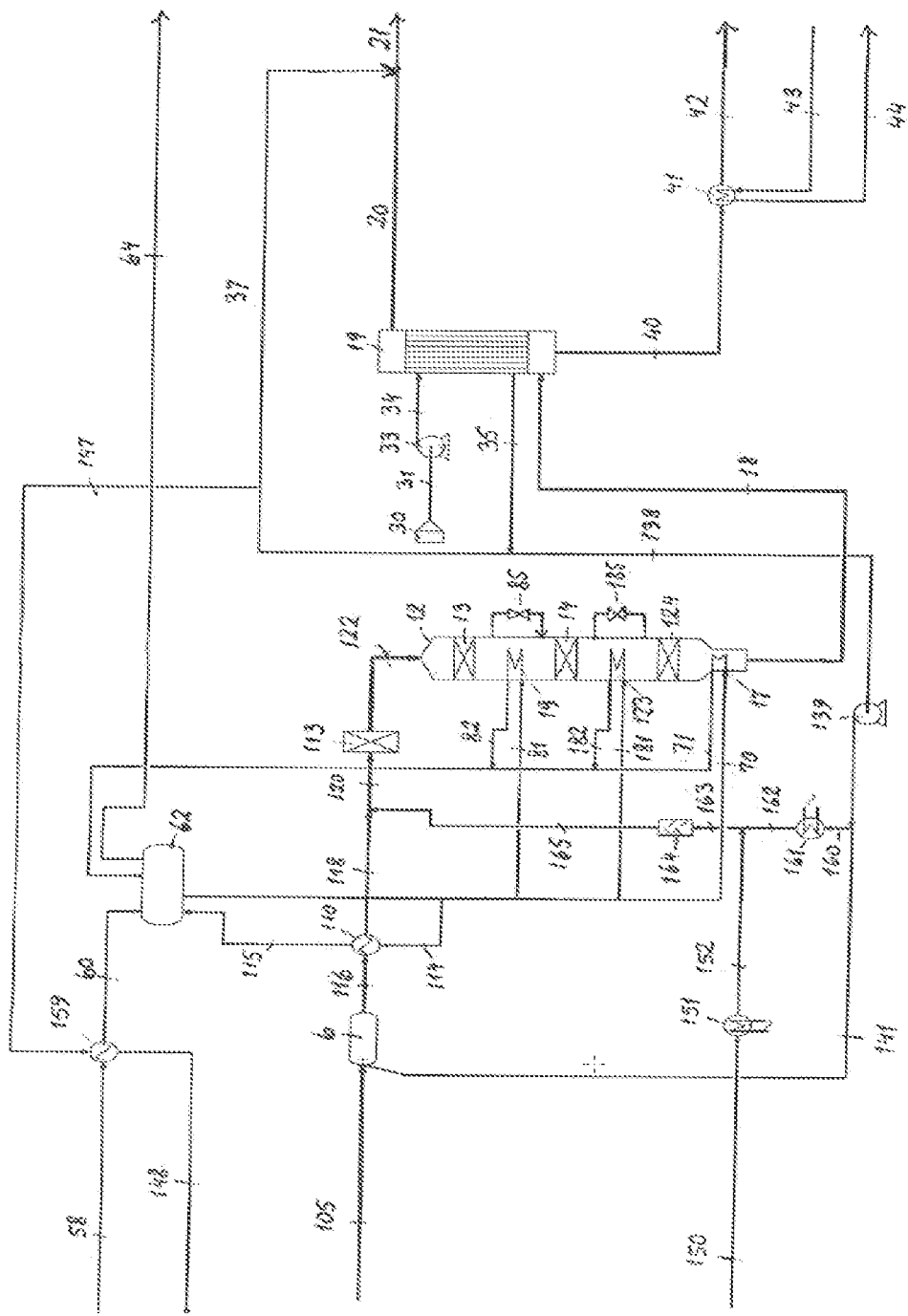

In the following, the invention is described in more detail with reference to the attached Figures, where FIG. 1 shows a typical wet gas sulfuric acid (WSA) plant configured for the treatment of a $CS_2$ and $H_2S$ containing lean gas from a viscose fiber production plant, FIG. 2 shows a WSA plant configured for treatment of a $CS_2$ and $H_2S$ containing lean gas from a viscose fiber production plant using the method of the present invention, FIG. 3 illustrates the application of the present invention, where a WSA plant is configured for regeneration of spent sulfuric acid, and FIG. 4 illustrates another application of the present invention, where a WSA plant is configured for treatment of an acid gas.

DESCRIPTION OF A WSA PLANT FOR THE TREATMENT OF VISCOSE OFF-GASES

A typical wet gas sulfuric acid (WSA) plant, configured for the treatment of a $CS_2$ and $H_2S$ containing lean gas from a viscose fiber production plant and producing sulfuric acid, is shown in FIG. 1. Typically, the lean gas will be atmospheric air with $CS_2+H_2S<2$ vol %.

The lean gas (1) is split into two parts, of which about ⅓ is sent to the thermal combustor (6) via line (3), where it is combusted together with fuel gas (7) which is needed to maintain a sufficiently high temperature in the combustor. The required oxygen for the combustion is contained in the lean gas. In addition to that, molten sulfur (8) can be fed to the combustor to boost the acid production and heat input to the combustor. The remaining ⅔ of the lean gas (4) bypasses the combustor and is used to quench the combustor flue gas (11) which is then fed to the $SO_2$ converter (12). The $CS_2$ and $H_2S$ contained in the by-passed lean gas is oxidized to $SO_2$, $CO_2$ and $H_2O$ in a first adiabatic catalytic bed (13) active for complete oxidation of $H_2S$ and $CS_2$. The heat of oxidation of $H_2S$ and $CS_2$ will typically increase the process gas temperature by 80-150° C.

The $SO_2$-containing process gas now enters the first adiabatic $SO_2$ oxidation bed (14) which is loaded with sulfuric acid catalyst active for oxidation of $SO_2$ to $SO_3$. In the first $SO_2$ converter bed, the majority of the $SO_2$ is oxidized to $SO_3$, which increases the process gas temperature at which the highest possible $SO_2$ conversion is below the emission requirements and thus a cooling step and another conversion step is required. In the inter-bed cooler (15), the partially converted process gas is cooled to the optimum inlet temperature of the second $SO_2$ converter bed, where the final $SO_2$ conversion takes place, bringing the overall $SO_2$ conversion into the 98-99.5% range. The process gas is then cooled in the process gas cooler (17) before it is sent to the WSA condenser (19). In the process gas cooler, $SO_3$ is partially reacting with $H_2O$ to form gaseous $H_2SO_4$. In the WSA condenser, the process gas is cooled to about 100° C., the hydration of $SO_3$ to $H_2SO_4$ is completed, and $H_2SO_4$ is condensed to form liquid concentrated $H_2SO_4$ which leaves the WSA condenser via line (40). The clean gas leaves the WSA condenser via line (20). The clean gas may be sent for additional $SO_2$ removal in e.g. a caustic or peroxide scrubber or an acid mist filter (not shown in FIG. 1) before hot air is added via line (37) and the gas is sent to stack via line (21).

The cooling medium for the WSA condenser is ambient air (31) compressed in the cooling air blower (33) and sent to the WSA condenser via line (34), leaving the WSA condenser via line (35).

For such a plant, heat recovery is of great importance. To save fuel gas and reduce the size of the combustor, only a fraction of the lean gas is combusted thermally, the major part of the lean gas being combusted catalytically in the first catalyst bed (13). The alternative would be all lean gas going to the combustor, significantly increasing the fuel gas consumption and the size of the combustor, which would require a waste heat boiler to cool the process gas to the $SO_2$ converter inlet temperature. The heat released in the combustor and the catalytic converter beds is modest and not sufficient to produce sufficient amounts of high pressure saturated steam required in the inter-bed cooler, and thus a quite complex thermal management system will be needed to maximize the production of saturated steam to the inter-bed boiler.

Demineralized water (50) is sent to the de-aerator (51) where oxygen is stripped off using low pressure steam (52) The deaerated boiler feed water leaves the deaerator via line (56) and the pressure is increased by the boiler feed water pump (57). The boiler feed water (58) is then preheated in the boiler feed water preheater (59) before it goes to the steam drum (62) via line (61). A small part of the boiler feed water is used for quenching the export steam (75). The high pressure steam drum is connected to two boilers, namely the process gas cooler (17) and the steam generator (80). Saturated steam leaves the steam drum via line (72), and it is superheated in the inter-bed cooler (15). The superheated steam is then sent to the steam generator (80) via line (73), where it is de-superheated, while saturated steam is produced in the steam generator. A part of the de-superheated steam is sent to the boiler feed water (BFW) preheater (59) where the steam is condensed and the heat is used for preheating the boiler feed water. The steam condensate leaves the BFW preheater via line (77) and is returned to the deaerator (51). The remaining partially de-superheated steam (75) is throttled to the desired export steam pressure and quenched to near saturation using boiler feed water from line (63) and sent to battery limit as export steam via line (64).

The described highly efficient and integrated heat management system is necessary to provide sufficient saturated steam to the inter-bed cooler, such that the process gas can be cooled to the optimal inlet temperature to the second $SO_2$ conversion catalyst bed. The heat exchangers are closely linked and have a rather narrow operating window in which the energy balance is in favor of producing sufficient or surplus amounts of saturated steam.

Description of a WSA Plant for the Treatment of Viscose Off-Gas Using the Present Invention A wet gas sulfuric acid (WSA) plant using the present invention configured for treatment of a $CS_2$ and $H_2S$ containing lean gas from a viscose fiber production plant is shown in FIG. 2.

With respect to the thermal combustion, lean gas bypass, catalytic $H_2S$ and $CS_2$ oxidation, $SO_2$ oxidation and $H_2SO_4$ condensation, the process gas layout of the present invention is largely similar to the traditional layout as described above.

The difference between the traditional layout of the WSA plant and the new layout according to the invention is within the thermal management of the plant.

In the new layout, demineralized water (50) is sent to the de-aerator (51) where oxygen is stripped off using low pressure steam (53). The de-aerated boiler feed water leaves the de-aerator via line (56), and the pressure is increased by the boiler feed water pump (57). The boiler feed water is sent further to the steam drum (62) via line (58). The steam drum is connected to two boilers, namely the process gas cooler (17) and the inter-bed cooler (19) which, in this layout, is configured as a boiler and not as a steam superheater as in the traditional layout. The saturated steam from the steam drum (83) can optionally be throttled before it is sent to battery limit as export steam via line (64).

The main task of the inter-bed cooler is to control the process gas temperature to the downstream catalytic bed and, with a boiler installed, the process gas temperature is controlled by leading a fraction of the hot process gas around the boiler via line (85).

However, since the temperature difference between the process gas passing through the boiler (19) and the bypassed gas (85) can be very large, the performance of the downstream second $SO_2$ converter bed will decrease if the temperature stratification becomes too large, even though the average temperature is appropriate. This is due to the fact that on one hand the catalyst used for the $SO_2$ oxidation is losing activity as the temperature is reduced, and on the other hand the conversion will be limited by equilibrium constraints if the temperature is too high. To prevent this, a mixing arrangement is required to mix the cold process gas coming from the boiler with the hot bypassed process gas.

In the new process layout, the inter-bed cooler is a steam generator (boiler), which can be of the fire tube type as well as of the water tube type. The fire tube boiler will typically have to be positioned outside the $SO_2$ converter shell, with an increased risk of creating cold spots and consequently condensation and corrosion by sulfuric acid. Due to the thick shell of a fire tube boiler, this boiler option is considered to be uneconomical.

A water tube boiler inside the $SO_2$ converter shell is the preferred solution because the tubes can be oriented in any position from horizontal to vertical, and moreover the tubes can be bare or finned.

It is preferred to use the same boiler pressure in the inter-bed cooler as in the process gas cooler as this allows for sharing the same steam drum and simplifies the layout of the plant. Special circumstances can favor the use of different steam pressures in the two heat exchangers, but this will require two steam drums or connection to an out-of-boundary-limit steam circuit.

The invention is described further in the examples which follow.

Example 1

In this example, 30,000 $Nm^3/h$ viscose off-gas containing 0.38 vol % $CS_2$, 0.36 vol % $H_2S$ and ambient air as balance, is treated in a WSA plant as shown in FIGS. 1 and 2, respectively. Additionally, 400 kg/h molten sulfur (7) is incinerated to boost the sulfuric acid production and to add supplemental heat for the thermal combustor, and 80 kg/h low pressure steam (54) is used for atomization of the molten sulfur. Natural gas (8) is added to the thermal combustor to achieve a temperature of 850° C. in the thermal combustor (6). The resulting process gas contains 2-3 vol % $SO_2$ after the catalytic oxidation of $CS_2$ and $H_2S$.

In this example, the sulfuric acid dew point temperature in the process gas stream (18) at the inlet of the WSA condenser (19) is 238° C. only. Therefore, the inlet temperature to the WSA condenser and also the saturated steam temperature in the steam system has been reduced to 270° C. and 255° C., compared to the maximum values of 290° C. and 263° C., respectively. This provides a minimum 17° C. margin to the sulfuric acid dew point in the inter-bed cooler (15)/inter-bed boiler (19) and process gas cooler (17) and 15° C. temperature approach in the cold end of the process gas cooler (17). The steam pressure corresponding to a saturated steam temperature of 255° C. is 42.2 barg.

The reason for reducing the steam pressure and the inlet temperature to the WSA condenser in this example is to maximize the steam production, and to reduce the cost of the steam system by providing a lower design pressure.

Table 1 below shows the difference in number of heat exchangers in the heat recovery system used to control the process temperatures in the plant. As it can be seen, the number of heat exchangers is reduced from four in the traditional layout to only two in the improved heat recovery system. In addition to that, the heat exchange area in the inter-bed cooler is reduced from 43 m² in the traditional layout (case A) to 8.5 m² in the new layout (case B). This reduction in heat exchange area is partly due to the improvement in the overall heat transfer coefficient, as boiling water with an almost infinite heat transfer coefficient replaces a lower convective heat transfer coefficient of the saturated/superheated steam. Also, the increased temperature differences in the boiler compared to the steam superheater reduces the required heat transfer area. Additionally, there will be a further cost saving, as the boiler typically is made of carbon steel, whereas the steam superheater is made of a more expensive alloyed steel.

In addition to the reduction in the number of equipment parts and the heat exchanger area, the new layout is much simpler in terms of process control.

The inter-bed boiler now operates independently of the operation of the plant, i.e. the performance of the heat exchanger is not dependent on sufficient production of saturated steam for cooling of the process gas.

This also has the benefit that start-ups can be carried out faster and more smoothly, and the operation of the plant will be much more robust towards changes in operation conditions. As an example, the traditional layout depends on a certain heat of reaction in the catalytic beds in order to produce a sufficient amount of saturated steam for the inter-bed cooler, and this constraint does not exist with the new inter-bed boiler solution. If there is an increase in cooling demand in the inter-bed cooler, e.g. by an increase in temperature out of the first catalytic bed (14), then the increase in cooling ability in the inter-bed cooler (15) must await the production of saturated steam in the process gas cooler (17) and the steam generator (80). Contrary to the simple process control in the improved layout, there is a very high degree of heat integration in the traditional layout because the superheated and saturated steam is used for steam production and preheating of boiler feed water, respectively, in order to provide a sufficient steam flow to the inter-bed cooler (15). So because the BFW preheater (59), the steam generator (80) and the inter-bed cooler (15) are all interdependent, any disturbance occurring in one of these heat exchangers will impact the operation of the whole plant.

The known high degree of heat recovery of the plant is maintained, the difference being that only saturated steam is produced in the new layout, whereas a certain degree of superheating was possible in the traditional layout. If superheated steam export is desired, a dedicated steam superheater can be included and installed anywhere between the combustor outlet and the outlet of the final $SO_2$ catalyst bed.

The following table illustrates a comparison between a sulfuric acid plant with traditional thermal management (case A) and a sulfuric acid plant with the new simple thermal management layout according to the invention, i.e. using an inter-bed boiler (case B).

TABLE 1

| | Case A | Case B |
|---|---|---|
| Number of heat ex-changers | 4 (TEMA: 2, Cross flow: 2) BFW preheater (59) Steam generator (80) Inter-bed cooler (15) Process gas cooler (17) | 2 (Cross flow: 2) Inter bed cooler (15) Process gas cooler (17) |
| Inter-bed cooler heat exchange area (15) | 43 m² | 8.5 m² |
| Inter-bed cooler cost index | 100 | 30 |
| Process gas duty | 2.7 Gcal/h | 2.7 Gcal/h |
| Duty transferred in steam cooling system | 4.1 Gcal/h | 2.7 Gcal/h |
| Duty recirculated in steam system | 48% | 0% |

From the table it is seen that the new layout has lowered the number of heat exchangers from 4 to 2 and reduced the size and cost of the inter-bed cooler significantly. In the traditional layout, 48% extra duty is internally transferred to cool the process gas, whereas in the new layout, no internal transfer/recycle of heat is needed to be able to achieve the desired cooling of the process gas.

Example 2

A further example of the application of the present invention is shown in FIG. 3. In this example, a WSA plant is configured for regeneration of 100 MTPD spent sulfuric acid (101) containing about 90 wt % $H_2SO_4$, 4 wt % $H_2O$, 0.3 wt % $SO_2$ and 5.7 wt % sulfur containing hydrocarbons. The spent acid (101) is atomized into the thermal combustor (6) by using atomizing air (102), and the heat input required to maintain a combustor temperature of ~1000° C. is supplied by burning fuel gas. Hot combustion air is supplied via line (141). In the thermal combustor (6), the spent acid is decomposed to $SO_2$, $H_2O$ and $CO_2$. The process gas (116) from the combustor is sent to the waste heat boiler (110), where the process gas is cooled. In a further cooling step, the process gas is cooled in the air preheater (111). The process gas then enters the electrostatic precipitator (112) where the dust, mainly coming from corrosion products from the upstream alkylation process, is removed.

Optionally, if NOx emissions need to be reduced, an SCR reactor (113) will be installed and a small amount of ammonia will then be added to the process gas via line (145). In order to ensure sufficient oxygen for the conversion of $SO_2$ to $SO_3$ in the $SO_2$ converter (12) and in order to reduce the sulfuric acid dew point of the process gas, preheated dilution air is added to the process gas via line (146). The diluted process gas (122) then enters the $SO_2$ converter (12), which in this case is configured with three adiabatic catalytic beds (13, 14 and 124) containing a sulfuric acid catalyst active for the oxidation of $SO_2$ to $SO_3$. In the first bed (13), the majority of the $SO_2$ oxidation takes place, increasing the process gas temperature out of the catalyst bed to 500-550° C. In the first inter-bed cooler (19), the partially converted process gas is cooled before being sent to the second bed (14) for further conversion. The further converted process gas is then sent to the second inter-bed cooler (123), where the process gas is cooled to the third bed (124) inlet temperature. The final $SO_2$ conversion ensures an overall $SO_2$ conversion of about 99-99.7%. The process gas is then cooled in the process gas cooler (17). The converted process gas (18) is then sent to the WSA condenser (19) for further cooling to about 100° C., hydration of $SO_3$ to $H_2SO_4$ and condensation of the $H_2SO_4$. The cooling medium for the WSA condenser is ambient air which is compressed in the cooling air blower (33). A fraction (138) of the hot air (35) from the WSA condenser is further compressed in the hot air blower (139) and used as combustion air (141) in the combustor (6) and as dilution air (142). The remaining hot air can be used for boiler feed water preheating in (159) and/or addition to the clean gas from the WSA condenser, which may optionally have been subjected to additional cleaning in e.g. a caustic or hydrogen peroxide scrubber and/or a mist filter (not shown in FIG. 3).

The process gas cooling taking place in the waste heat boiler (110), the first and the second inter-bed cooler (19 and 123) and the process gas cooler (17) are by means of steam boilers, preferably water tube boilers. The first and the second inter-bed coolers are both to be configured with a hot process gas bypass (85, 185) and a downstream mixer (not shown) to ensure optimal and uniform inlet temperature for the downstream catalyst beds. All boilers are connected to the steam drum (62) via risers and downcomers (70/71, 81/82, 114/115 and 181/182). Finally, saturated export steam is withdrawn from the steam drum via line (64). In case the steam export is required to be superheated, one of the two inter-bed coolers may be configured as a steam superheater similar to the layout shown in FIG. 1. Alternatively, the steam superheater can be placed anywhere between the outlet of the waste heat boiler (110) and the inlet to the $SO_2$ converter (12).

In this example, the sulfuric acid dew point temperature in the process gas stream (18) at the inlet to the WSA condenser (19) is 263° C. due to a high content of both water and $SO_3$ vapor. Therefore, the inlet temperature to the WSA condenser and also the saturated steam temperature in the steam system is selected as the maximum values 290° C. and 263° C., respectively. This provides a minimum 12° C. margin to the sulfuric acid dew point in the inter-bed boilers (19, 123) and process gas cooler (17) and 15° C. temperature approach in the cold end of the process gas cooler (17).

In the traditional layout, the inter-bed coolers are steam superheaters, using the saturated steam produced in the waste heat boiler (110) and the final process gas cooler (17). Although the production of saturated steam is higher than in the case with the viscose off-gas (Example 1), the production is not high enough to ensure a simple control of the two inter-bed coolers. Traditionally, the saturated steam is first passed through the second inter-bed cooler for first superheating and then to the first inter-bed cooler for final superheating, each cooler being equipped with a bypass system for control of the process gas temperature. Between the two inter-bed coolers it is necessary to add a steam de-superheater to allow for sufficient cooling of the process gas in the first interbed cooler. The de-superheater is often a compact boiler, producing saturated steam for the steam cooling circuit. The superheated steam leaving the first inter-bed cooler may also be required to pass through a de-superheater to produce more saturated steam for the steam cooling system. In the traditional layout, the internal transfer of heat is only 5% of the total duty (see Table 1 in Example 1 for explanation), which again is reduced to 0% in the new layout of the invention.

The traditional steam cooling system has a very high heat recovery, but also interdependency between the heat exchangers. As the inter-bed coolers need saturated steam to function, the start-up of the plant can be long because the production of saturated steam must balance the need for cooling in the inter-bed coolers.

This complexity and interdependency is eliminated by the introduction of boilers as inter-bed coolers—the control of the process gas temperature to the second and the third catalyst beds being straightforward as the process gas is bypassed and the cooling does not depend on production of steam in other heat exchangers. This also allows for a much faster start-up of the plant.

As in Example 1, the new layout allows the same high heat recovery as the traditional layout with the use of fewer heat exchangers. The inter-bed coolers will require less heat transfer area and the material of construction will be carbon steel as opposed to the higher alloyed steels employed for the traditional heat exchangers.

Example 3

A further example of the application of the present invention is shown in FIG. 4. In this example a WSA plant is configured for treatment of an acid gas. An acid gas containing 30 vol % $H_2S$, 0.4 vol % CO, 0.1 vol % $H_2$, 700 ppmv COS and $CO_2$ as balance is sent to the thermal combustor (6) via line (105). In the thermal combustor, the acid gas is oxidized to $SO_2$, $CO_2$ and $H_2O$. The required oxygen for the combustion and $SO_2$ oxidation is sent to the combustor as hot air via line (141). The process gas from the combustor enters the waste heat boiler (110) via line (116). In the waste heat boiler, the process gas is cooled to the $SO_2$ converter inlet temperature. Depending on the requirement for $NO_x$ emission, the process gas may then be subjected to $NO_x$ reduction in the SCR reactor (113), and the required ammonia for the SCR reaction is added to the process gas via line (165). The $SO_2$ containing process gas (122) then enters the $SO_2$ converter (12) which, like in Example 2, is configured with three adiabatic catalyst beds with interbed cooling carried out by the first and the second interbed cooler (19, 123). In the process gas cooler (17), the process gas is cooled to 290° C. and the $SO_3$ is partially hydrated to $H_2SO_4$. The converted process gas (18) is then sent to the WSA condenser for further cooling to about 100° C., hydration of $SO_3$ to $H_2SO_4$ and condensation of concentrated $H_2SO_4$. The cooling medium for the WSA condenser is ambient air which is compressed in the cooling air blower (33). A fraction (138) of the hot air (35) from the WSA condenser is further compressed in hot air blower (139) and used as combustion air (141) in the combustor (6). The remaining hot air can be used for boiler feed water preheating in (159) and/or addition to the clean gas from the WSA condenser, which may optionally have been subjected to additional cleaning in e.g. a caustic or hydrogen peroxide scrubber and/or a mist filter (not shown in FIG. 4).

The process gas cooling taking place in the waste heat boiler (110), the first and the second inter-bed cooler (19 and 123) and the process gas cooler (17) is achieved by means of steam boilers, preferably a fire tube boiler for the waste heat boiler and water tube boilers for the interbed cooler and process gas cooler. The first and the second inter-bed coolers are both to be configured with a hot process gas bypass (85, 185) and a downstream mixer (not shown) to ensure an optimal and uniform inlet temperature to the downstream catalyst beds. All boilers are connected to the steam drum (62) via risers and downcomers (70/71, 81/82, 114/115 and 181/182). In case the steam export is required to be superheated, one of the two inter-bed coolers may be configured as a steam superheater similar to the layout shown in FIG. 1. Alternatively, a dedicated steam superheater may be installed between the waste heat boiler (110) and the $SO_2$ converter (12).

In this example, the sulfuric acid dew point temperature in the process gas stream (18) at the inlet to the WSA condenser (19) is 260° C. due to a high content of both water and $SO_3$ vapor. The inlet temperature to the WSA condenser and also the saturated steam temperature in the steam system are selected as 290° C. and 260° C., respectively. This provides a minimum 15° C. margin to the sulfuric acid dew point in the inter-bed boilers (19, 123) and process gas cooler (17) and 15° C. temperature approach in the cold end of the process gas cooler (17).

In this specific layout, the production of saturated steam in the waste heat boiler (110) and the process gas cooler (17) is sufficient for a simple layout of the inter-bed coolers with saturated or superheated steam on the cold side of the heat exchangers, and thus the complexity and interdependency is less in the traditional layout.

However, in the new layout according to the invention, the size and cost of the inter-bed coolers will still be significantly reduced, and the start-up of the plant with the new layout will still be faster.

The invention claimed is:

1. A method for cooling of process gas between catalytic beds in a wet gas sulfuric acid plant, in which sulfuric acid is produced by condensation of $H_2SO_4$ from a feed stream, wherein the feed stream comprises at least one of a feed gas containing sulfurous components and a liquid feed containing sulfurous components, wherein at least one boiler is used to cool the process gas between the catalytic beds in a $SO_2$ converter of the plant.

2. The method according to claim 1, wherein the at least one boiler is a water tube boiler.

3. The method according to claim 2, wherein the orientation of the water tube boiler is approximately horizontal.

4. The method according to claim 3, wherein the water tube boiler comprises tubes in a tube bank, wherein the tubes are bare, fitted with fins or have a combination of finned and bare tubes in the tube bank.

5. The method according to claim 2, wherein the water tube boiler is provided with a process gas side bypass in order to be able to control the inlet temperature to a downstream catalyst bed.

6. The method according to claim 5, wherein the bypass is internal.

7. The method according to claim 5, wherein the bypass is external.

8. The method according to claim 2, wherein the water tube boiler is placed within a shell of the $SO_2$ converter.

9. The method according to claim 1, wherein the process gas originates from combustion of at least one feed stream of spent sulfuric acid.

10. The method according to claim 1, wherein the feed stream is a $CS_2$ and $H_2S$ containing gas from a viscose fiber production plant.

11. The method according to claim 1, wherein the inlet temperature to a downstream catalyst bed is controlled by using a mixer to equalize a temperature difference.

* * * * *